(12) United States Patent
Hammerschmidt

(10) Patent No.: US 9,689,770 B2
(45) Date of Patent: Jun. 27, 2017

(54) SELFCALIBRATION OF CAPACITIVE PRESSURE SENSORS WITH ELECTROSTATIC FORCES

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 414 days.

(21) Appl. No.: 14/333,736

(22) Filed: Jul. 17, 2014

(65) Prior Publication Data

US 2016/0018281 A1 Jan. 21, 2016

(51) Int. Cl.
*G01L 27/00* (2006.01)
*G01L 9/00* (2006.01)

(52) U.S. Cl.
CPC .......... *G01L 27/005* (2013.01); *G01L 9/0073* (2013.01)

(58) Field of Classification Search
None
See application file for complete search history.

(56) References Cited

U.S. PATENT DOCUMENTS

2006/0161364 A1* 7/2006 Wang .................... G01L 27/002
702/98
2009/0036754 A1* 2/2009 Pons ................... A61B 5/02156
600/301
2011/0040206 A1* 2/2011 Burger ................... A61B 5/031
600/561
2012/0074972 A1 3/2012 Rasbornig et al.
2013/0000411 A1* 1/2013 Robert .................. G01L 9/0052
73/708

OTHER PUBLICATIONS

Cozma, et al. "Electrostatic Actuation as a Self-Testing Method for Silicon Pressure Sensors." Sensors and Actuators, A 60 (1997) 32-36.
Puers, et al. "A Novel Combined Redundant Pressure Sensor with Self-Test Function." Sensors and Actuators A 60 (1997) 68-71.
Weiler, Dirk. Abstract of Doctoral Dissertation entitled "Self-Test and Fault Tolerance with Approved Mild Degradation in CMOS Integrated Sensor Systems." Published Jun. 21, 2001.
Written Opinion dated Apr. 2007 in connection with PCT Application No. PCT/EP2008/065358.

* cited by examiner

*Primary Examiner* — Robert R Raevis
(74) *Attorney, Agent, or Firm* — Eschweiler & Potashnik, LLC

(57) ABSTRACT

A pressure sensor calibration system comprises one or more pressures sensors for calibrating sensor parameters based on a membrane deflection or a membrane displacement from an electrostatic force. A measuring component measures capacitance values corresponding to applied voltages at the electrodes of the one or more pressure sensors. Sensor parameters are derived from capacitance measurements and a pressure measurement, which are utilized by a calibration component for calibration and recalibration of the one or more pressure sensors.

22 Claims, 10 Drawing Sheets

SELFCALIBRATION OF CAPACITIVE PRESSURE SENSORS WITH ELECTROSTATIC FORCES

FIELD

The present disclosure is in the field of pressure sensors, and more specifically, calibration and recalibration of pressures sensors with one or more electrostatics forces.

BACKGROUND

A capacitive pressure sensor uses a moveable diaphragm and a pressure cavity to create a variable capacitor. The variable capacitor exhibits a capacitance that varies in correspondence to forces introduced by the measured pressure. For the integration of the sensor cells into electronics those sensor cells are often connected to form arrays or bridges, however from a system point of view those cell networks still act like a single sensor. Sensors are calibrated initially at the end of a fabrication process or line, usually under defined measurement conditions. The calibration and further recalibration can comprise various different pressures at different temperatures, which may utilize specialized test equipment and significant testing times.

DETAILED DESCRIPTION

Figure 1:
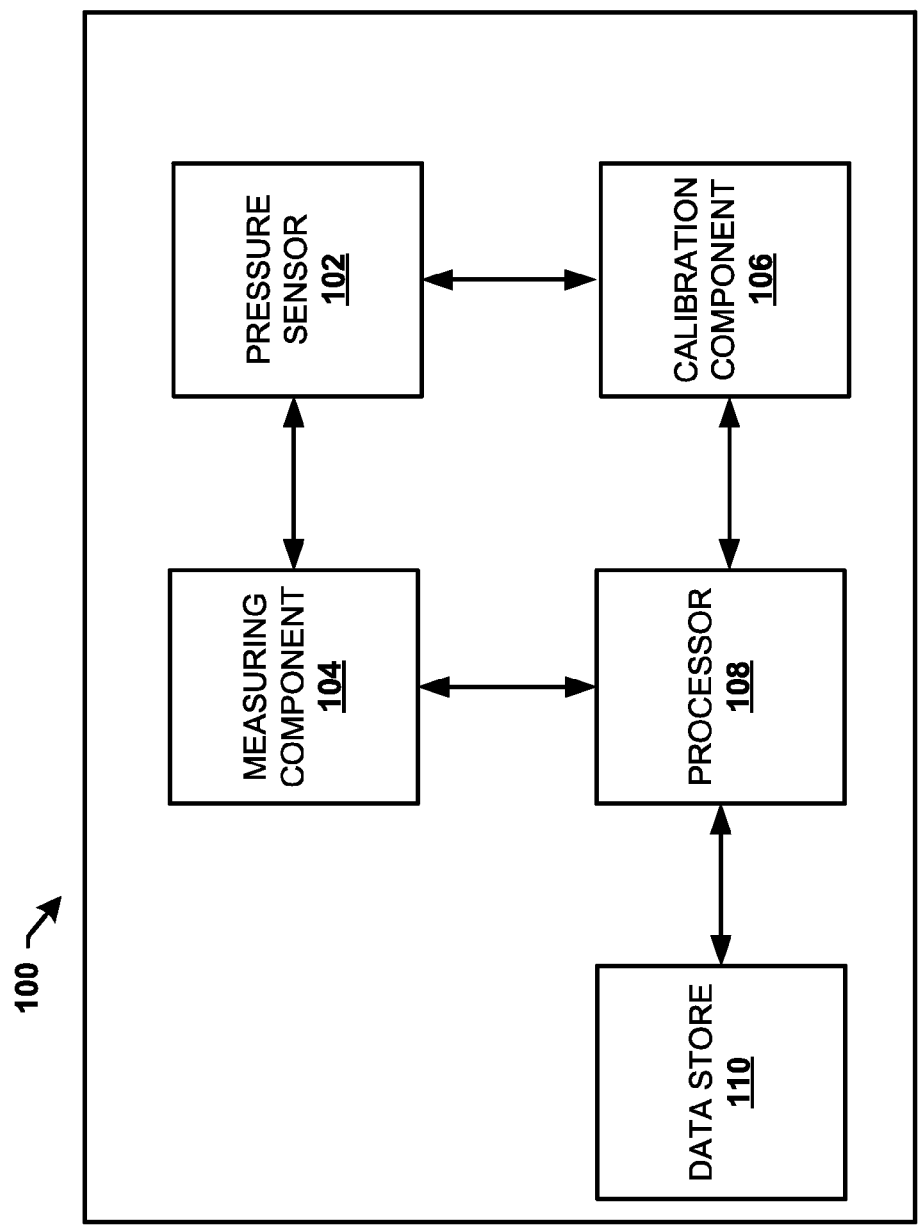
FIG. 1 is a block diagram illustrating a pressure sensor system for calibration and recalibration of a pressure sensor according to various aspects described.

The present invention will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer with a processing device. By way of illustration, an application running on a server and the server can also be a component. One or more components can reside within a process, and a component can be localized on one computer and/or distributed between two or more computers.

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

In consideration of the above described deficiencies, various aspects for calibrating and recalibrating one or more pressure sensors are described, such as for a micro electromechanical system (MEMS) pressure sensor. For example, pressure sensor systems are described for calibrating and recalibrating pressure sensors that can be stimulated by an electrostatic force overlaying a deflection caused by a resulting pressure at a diaphragm or membrane. The system further enables self-extracting of pressure sensor parameters or parameter values for calibration or recalibration of the pressure sensor. The system and methods disclosed operate to model a physical behavior of one or more pressure sensors by the generation of a simplified physical model with equations that enable the calibration or recalibration of the sensors based on sensor parameters that have a physical meaning.

For example, a pressure sensor calibration system can comprise a pressure sensor with electrodes and a membrane, which generates a deflection or a displacement from a first position to a second position as a function of an electrostatic force. Sets, or pairs, of applied voltages can be applied via a biasing component to the electrodes for generating the applied voltages and thereby induce the electrostatic force for the resulting deflection. A measuring component of the system can determine measurements of sets of capacitance values that correspond to sets of applied voltages at the electrodes of one or more pressure sensors by the displacement of the membrane as the function of the electrostatic force. A calibration component of the system can further calibrate a pressure sensor to target values with the sensor parameters derived from the measurements of the sets of capacitance values and from a pressure (e.g., an ambient or atmospheric pressure). A parameter component can operate to determine the set of sensor parameters based on a model (e.g., a capacitive bridge model, or a moving plate model, etc.) generated by a model component that is configured to model the displacement of the first membrane from the first position to the second position within a reduced operating range. For example, the displacement can be characterized by a nonlinear function of an actual configuration of the pressure sensor and a two dimensional deflection curve at the electrodes of the sensor. For example an array or a bridge of equal sensor cells, different sensor cells or even other capacitors without pressure sensitivity is abstracted by a simplified sensor cell model used in the parameter component. Additional aspects and details of the disclosure are further described below with reference to the figures.

Referring now to FIG. 1, illustrated is an example of a pressure sensor system 100 for calibration and recalibration of a pressure sensor utilizing an electrostatic force. The system 100 can be a part of, or coupled to, other systems operating in conjunction for calibrating and recalibrating one or more sensors, such as pressure sensors for sensing pressure forces or a quantifiable amount of one or more pressure forces. The system 100 comprises a pressure sensor 102, a measuring component 104, a calibration component 106, one or more processors 108 and a data store 110.

The pressure sensor 102 can be configured to measure various pressure forces from any one of a number of different variables such as fluid/gas flow, air, speed, water level, altitude, and others by acting as a transducer and generating a signal as a function of the sensed pressure. For example, the pressure sensor 102 can comprise a force collector comprised of a diaphragm or membrane that measures a strain, or a deflection, that results from an applied force over an area of the membrane. The pressure sensor 102, for example, can comprise electrodes and a membrane that reacts with a deflection induced by an electrostatic force generated by a voltage applied between the membrane and at least one of the electrodes. The pressure sensor 102 can comprise a single pressure sensor component, or a plurality of pressure sensors coupled together. The pressure sensor 102 can comprise a micro electromechanical system (MEMS) pressure sensor that comprises components ranging about 1 to 100 micrometers in size, or nano-scale components, for example. Pairs, or sets, of applied voltages can be sensed or applied to the electrodes of the pressure sensor 102 for causing slow-moving or stationary electrical charges among different electrode terminals that generate an electrostatic force, which can be similar or the same in magnitude and direction as a pressurizing force from one or more other variables.

The pressure sensor 102, for example, is configured to be stimulated by an electrostatic force induced to overlay a deflection or displacement portion of the pressure sensor, such as at a bendable membrane. The deflection via the electrostatic force enables an extraction of sensor parameters, which can further be modeled, stored and utilized for the calibration and recalibration of the pressure sensor, or a comparison between measurements with respect to time across a time differential. This comparison can then be used via other components that are communicatively coupled to the system 100 for initially calibrating, adjusting, or recalibrating the pressure sensor at a later time with various values related to one or more of the sensor parameters. Membrane area, spring constants, dimensions, distance between electrodes, height from membrane to a cavity bottom, a permittivity constant, applied pressure, linearization polynomial coefficients and other such variables are examples of the different sensor parameters, which can be a part of the sensor function and the manufacturing specifications that reside within a process tolerance or fabrication range.

The pressure sensor 102 can be initially calibrated and then subsequently recalibrated based on a simplified model to adjust for various unintended inaccuracies of the sensor parameters, such as via operation wear, process tolerances, temperature influence or other altering variables. In particular, the measuring component 104 can operate to determine measurements, or measured quantities for calibration and recalibration processes of the pressure sensor 102. For example, the measuring component 104 can operate to measure sets of capacitance values generated by capacitances induced at electrodes of the sensor. The capacitances can correspond to applied voltages provided at the electrodes of the pressure sensor 102, and can further result, for example, from a displacement or a deflection of the membrane of the pressure sensor 102 as a function of the electrostatic force.

Calibration and recalibration of the pressure sensor 102, for example, can comprise utilizing electrostatic forces generated by voltages applied to the plates of the pressure sensor 102 and evaluating corresponding changes of the capacitance values to generate a model of the sensor parameters via the measuring component 104. Evaluation of the capacitance changes can be performed via an open loop pathway by changing the sensor bias voltage and measuring the corresponding reaction of the sensor capacitor values, or an evaluation can be performed via a feedback loop such as a closed force feedback loop, for example.

A calibration component 106 of the system 100 is configured to calibrate the pressure sensor 102 to a set of target values with a set of sensor parameters derived from the measurements of the sets of capacitance values. The target values, for example, can comprise factory operating range values for one or more parameters intended to define one or more functions of the pressure sensor. A calibration and a recalibration can be generated from parameter values derived from the measurements and one or more pressures, such as an ambient pressure or other pressure. The pressure sensor 102 can, for example, be calibrated at the end of a fabrication process line under defined measurement conditions, which can be performed with different pressures at different temperatures, but a simplified model generated by the system can function similarly and more efficiently over specialized testing equipment and significant testing time for calibration. Calibrations, for example, can often involve complex polynomials with respect to pressure and temperature, piecewise linear functions or spline functions as well.

The system 100, for example, generates a calibration process via the calibration component 102 and a recalibration process of the pressure sensor 102 by generating a simplified model and extracting parameter values via the model. The model, for example, can be a capacitance model such as a capacitance bridge based model, a moving plate based model, or other type capacitance model for performing more efficient calibrations and recalibrations for one or more pressure sensors 102.

For example, electrodes of the pressure sensor 102 can operate to form a capacitive full bridge, in which various voltages can be applied an input pair of nodes or terminals of the capacitive full bridge. Capacitance values can be obtained at an output pair of nodes of the capacitance full bridge and further utilized to derive, estimate, and re-calculate operating parameters of the sensor. The capacitance values can include capacitance values derived from a differential output utilized to model different parameters of the pressure sensor. The capacitive bridge modeled across the electrodes can couple to electrodes that bridge one or more pressure sensors 102 comprising different parameters of operation for modeling displacement by an electrostatic force.

Because a deflection of a membrane or diaphragm of the pressure sensor 102 is bent or displaced by distributed forces, the behavior can be modeled in a complicated function and also behaves differently for pressure forces and electrostatic forces. Therefore, the macroscopic behavior of the pressure sensor can be described with a generated model, which is limited to a reduced operating range or an operating range that is less than a fabricated or normal standard operating range for the pressure sensor 102. The reduced operating range, for example, can be characterized by a small displacement in a Z direction along a Z-axis of a three dimensional Cartesian coordinate system as compared to a fabrication distance d of the electrodes or plates of the pressure sensor. Within the range of validity or reduced operating range, the displacement Z can represent a function of the membrane or diaphragm bending w with respect to a an x- and y-axis as w(x,y) or of the real/actual diaphragm averaged over x- and y-dimensions of the diaphragm.

In one aspect, the pressure sensor 102 can comprise a MEMS sensor with a membrane that can be deflected by electrostatic forces with a system for calibration and recalibration. The calibration via the calibration component 106 can be based on a reduction of complexities to an approximation described by equations having a physical meaning or background. Additionally, recalibration of the pressure sensor 102 can be further performed via the same model, which can be further stored along with the sensor target values, parameter values, capacitances, etc. in data store 110 and processed via one or more processors 108 for further reference or calculated re-iterations via the model.

Figure 2:
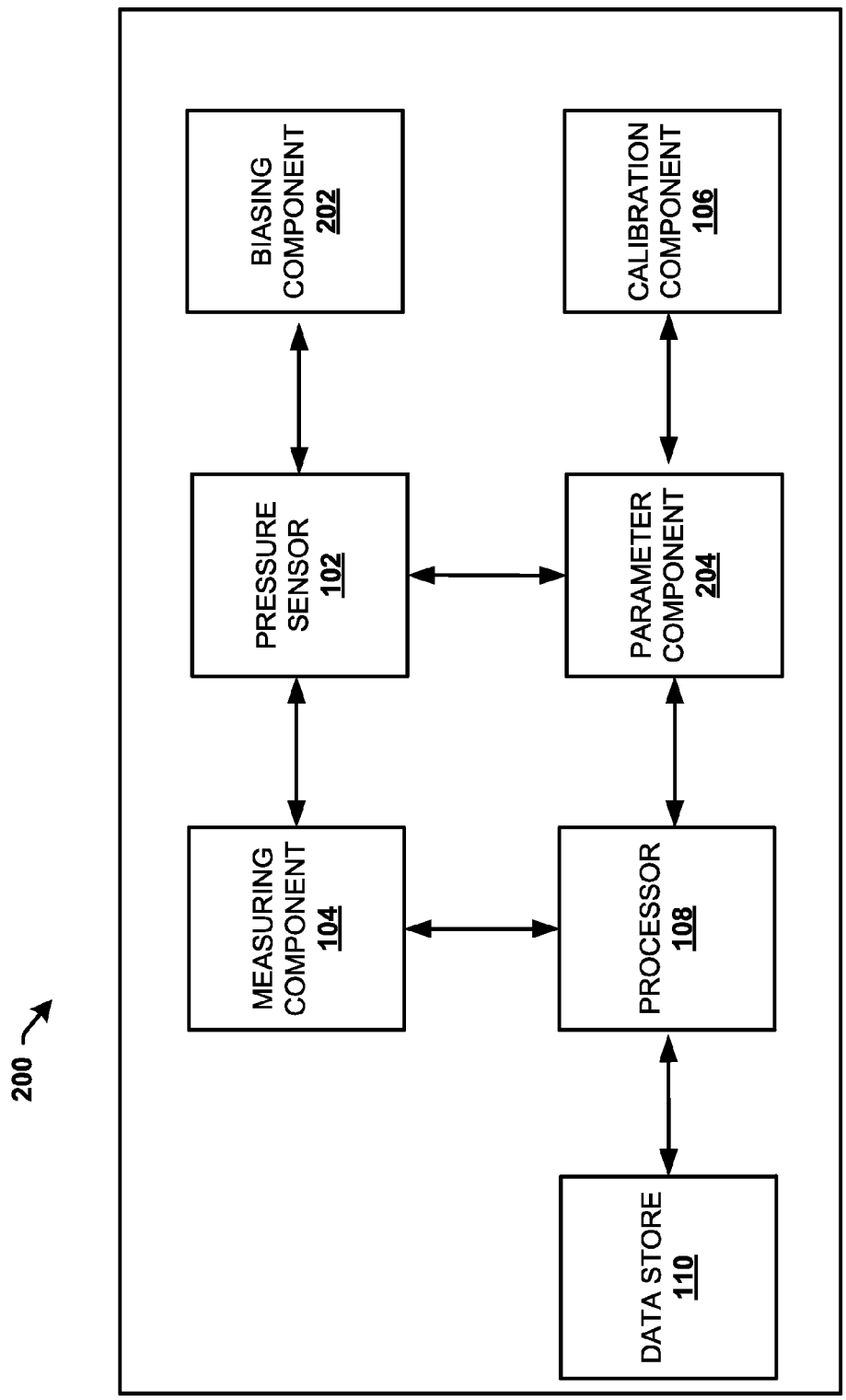
FIG. 2 is a block diagram illustrating another pressure sensor system for calibration and recalibration of a pressure sensor according to various aspects described.

Referring now to FIG. 2, illustrated is a system for calibrating and recalibrating one or more pressure sensors according to further various aspects. The system 200 illustrates similar components as discussed above and further comprises a biasing component 202 and a parameter component 204.

The biasing component 202 can be configured to generate a bias voltage to electrodes of the pressure sensor 102 and facilitate control of the displacement of a pressure sensor membrane with an electrostatic force. The biasing component 202 can generate the electrostatic force with the applied voltages via an open path, or a closed loop feedback path based on the sensor parameters (e.g., diaphragm/membrane area) and at least one pressure, such as an ambient pressure without having more than one pressure reading or measurement. The pressure can be obtained from an external reading or system internal reading, which can be, for example, of an ambient pressure.

The biasing component 102 can generate a bias voltage or an applied voltage to sensor electrodes of the sensor 102, and facilitate control of the displacement of a sensor membrane with the electrostatic force via a control path, for example, by modifying the bias voltage. The measuring component 104 is further configured to measure the sets of capacitance values corresponding to the sets of applied voltages across a time differential, at a first time and a second time with respect to the modifications.

In addition or alternatively, the measuring component 104 can operate to measure sets, or pairs, of capacitances simultaneously among at least two pressures sensors that comprise different sets of sensor parameters. One or more of these sensor parameters, for example, can be matched with one another. For example, the sensors could be selected prior to model generation to be functionally equivalent, or almost equivalent. For example, the areas of a membrane can vary, while fabrication distances between the plates or the electrodes of different sensors can be at least substantially equal. The fabrication tolerances that derive from the tolerances during fabrication processing have to be at least substantially equal, or within the same tolerance of design, for example, which enables the fabrication tolerances of the two sensors to be described by one variable technological parameter within the model being generated for elimination of independent variables from the equation system that has to be solved during calibration and recalibration. Aspects of the model generated with this technological parameter are further described and illustrated infra.

The parameter component 204 of the system 200 is configured to determine or derive sensor parameters based on the model that is generated by the system and/or stored in the data store 110. As stated above, the model can be a capacitive model (e.g., a capacitive bridge model, a moving capacitor plate model, or the like) that models the displacement of the first membrane from a first position to a second position within the reduced operating range. For example, the displacement can be characterized or modeled by a nonlinear function of an actual configuration of the first pressure sensor and a two dimensional deflection curve of the first plurality of electrodes. In one aspect, the model can comprise a plate capacitor with at least two plates comprising a distance that changes depending on applied pressure springs that resist the displacement and an electrostatic force being induced.

Figure 3A:
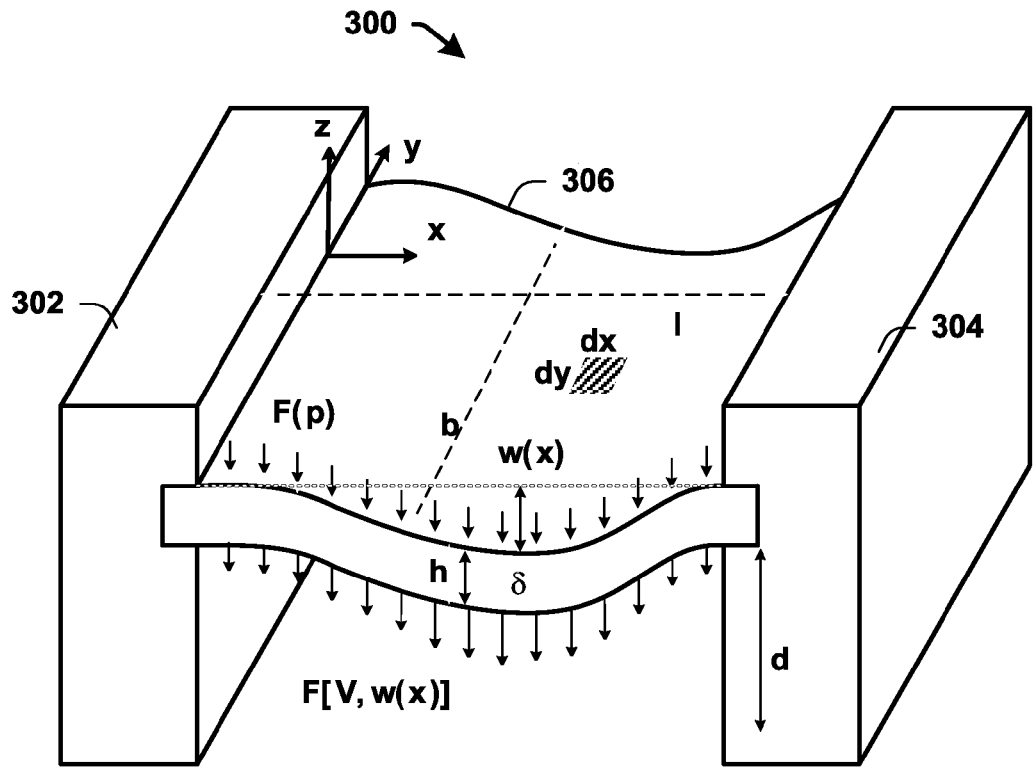
FIGS. 3A-3B are diagrams illustrating pressure sensor models for calibration and recalibration of a pressure sensor according to various aspects described.
Figure 3B:
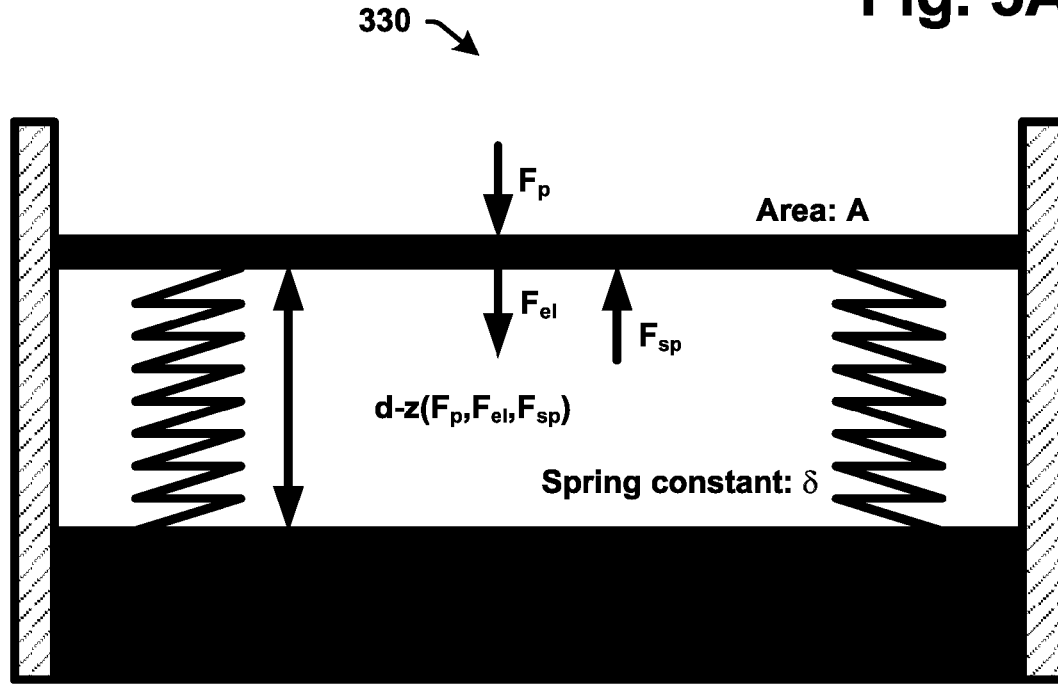

Referring now to FIGS. 3A and 3B, illustrated are diagrams of example pressure sensor models for calibration and recalibration of one or more pressure sensors according to various aspects being disclosed. FIG. 3A illustrates an example diagram model 300 of a pressure sensor (e.g., sensor 102) that demonstrates a voltage required to achieve one or more target values such as a capacitance value between plates 302 and 304 of the pressure sensor based on defined sensor parameters (e.g., membrane area (A), a distance (d), a height of the membrane (h), a spring constant ($\delta$), an applied pressure (p), etc.), in which other parameters can also be incorporated in the model generation or the modeling process for calibration/recalibration such as a permittivity constant ($\epsilon$), a coefficient of expansion, a material coefficient like the Young's modulus or other relevant parameters. An advantage of characterizing these parameters via applied voltages (V) to induce an electrostatic force is a relatively simple structure, which can be applicable for numerical evaluations on a relatively small processor, such as a digital signal processor (DSP) that includes or is a part of the system components.

The model according to FIG. 3B can be configured to model the displacement of a membrane of the pressure sensor from the more detailed model according to FIG. 3A a first position to a second position, which can be a function of a bending within a reduced operating range. In this manner, a simplified model according to FIG. 3B can be installed in the system instead of a complex bending behavior of a real membrane that is illustrated as an example in FIG. 3A and enables equations that can be realistically solved with sufficient accuracy and reliability in the field. The displacement (w), for example, can be characterized by a complex nonlinear function of a real or actual arrangement of the pressure sensor and at least a two dimensional deflection curve of the membrane 306 across the sensor electrodes 302, 304. This displacement can be demonstrated, for example, along a z-axis in a z-direction by a bending function with respect to an x-axis displacement in an x-direction and a y-axis displacement in a y-direction.

The following equations can operate to describe the models 300 and 330 of FIG. 3B for example and can serve as an approximation for the structure in FIG. 3A within a limited validity range:

$$F_{el} = \frac{1}{2} \cdot \frac{\varepsilon \cdot A \cdot V^2}{(d-Z)^2};$$ eqn. 1 for an electrostatic force;

$$F_{sp} = \delta \cdot z;$$ eqn. 2 for a spring force;

$$F_p = p \cdot A;$$ eqn. 3 for a pressure force;

$$\frac{1}{2} \cdot \frac{\varepsilon \cdot A \cdot V^2}{(d-Z)^2} + -\delta \cdot z + p \cdot A = 0; \text{ and}$$ eqn. 4

$$V(z)^2 = \frac{2 \cdot (d-Z)^2 \cdot (\delta z - A \cdot p)}{A \cdot \varepsilon}.$$ eqn. 5

The equations below further describe parameters such as an applied voltage that facilitates an electrostatic force to achieve a certain capacitance between plates or electrodes 302 and 304 of the pressure sensor.

$$C(z) = \frac{e \cdot A}{d-z}$$ eqns. 6

$$z(C) = d - \frac{A \cdot e}{C}$$

$$V(C)^2 = -\frac{2 \cdot A \cdot \varepsilon \cdot (A - p - \delta \cdot d)}{C^2} - \frac{2 \cdot A^2 \cdot \varepsilon^2 \cdot \delta}{C^3}.$$

Equations 1 through 6, with additional formulations below, demonstrate that two different measurements of at least two pairs of electrostatic driving voltages and capacitances (e.g., $V_1$, $C_1$, and $V_2$, $C_2$) can be modeled and captured at the same pressure (p), such as at an ambient pressure. The same pressure (p), for example, can be a single pressure that is independent of any other pressure reading or other external pressure for recalibration of the pressure sensor 102.

The symbol (A), for example, can designate a membrane area 306 that comprises dimensions (h) for a height or vertical width of the membrane and at a distance (d) from a bottom of one or more plates/electrodes 302, 304. The membrane 306 can be a diaphragm or flexible structure that is sensitive to pressure forces and spans between plates 302 and 304. A bending of the membrane 306 can be induced by an applied voltage that operates as an electrostatic driving voltage. The electrostatic force generated across the membrane can cause a variation in the membrane as a bending, deflection or displacement from a first position to a second position. The bending, for example, can be a function of a displacement in a three dimensional plane with a Cartesian coordinate system having an x-axis, y-axis and a z-axis. The bending function w(x) can be expressed as w(x, y), or as w(x, y, z), in which bending w(x, y) can represent the displacement Z within a reduced operating range of the real diaphragm 306 averaged over the x and y dimensions of the diaphragm. The reduced operation range, for example, can be an operating range that is reduced relative to a standard, a normal, or a manufactured operating range. The reduced operating range, for example, can be a range of operation that is a subset of the normal, standard, or manufactured range of operation, such as provided in a manufacturer specification sheet or product data sheet, or the reduced operating range can be a range of operation that is less than this normal, standard or manufactured range of operation e.g. a reduced range of the measured pressures and the applied electrostatic forces that bend the membrane which are specified in a way that deflection of the membrane stays small. Additionally, the reduced operation range can be characterized as a small displacement z compared to a fabrication distance (d) of the plates 302, 304.

The models 300 and 330 can also be generated and demonstrated via an inverse solution of the equation C(V) as with the below set of derived equations:

$$p = \frac{\delta}{A} \cdot d - \left( \frac{1}{C_1} \cdot \delta \cdot \varepsilon + \frac{C_1^2 \cdot V_1^2}{2 \cdot \varepsilon \cdot A^2} \right)$$ eqns. 7

$$p = \frac{\delta}{A} \cdot d - \left( \frac{1}{C_2} \cdot \delta \cdot \varepsilon + \frac{C_2^2 \cdot V_2^2}{2 \cdot \varepsilon \cdot A^2} \right)$$

$$\frac{\delta}{A} \cdot d - \left( \frac{1}{C_1} \cdot \delta \cdot \varepsilon \cdot \frac{C_1^2 \cdot V_1^2}{2 \cdot \varepsilon \cdot A^2} \right) = \frac{\delta}{A} \cdot d - \left( \frac{1}{C_2} \cdot \delta \cdot \varepsilon + \frac{C_2^2 \cdot V_2^2}{2 \cdot \varepsilon \cdot A^2} \right)$$

$$\delta = \frac{1}{2 \cdot A^2 \cdot \varepsilon^2} \cdot \frac{C_1^3 \cdot C_2 \cdot V_1^2 - C_1 \cdot C_2^3 \cdot V_2^2}{C_1 - C_2}.$$

By performing two different measurements two pairs of corresponding values of capacity and electrostatic driving voltage (V1, C1) & (V2, C2) can be captured at the same pressure (p). Because the electrostatic measurement can be done very fast (e.g., less than a micro second), the pressure (e.g., atmospheric) will not change remarkably between the two measurements for most applications. In response to the area (A) of the pressure sensor diaphragm being known or determined, the spring constant (δ) can be derived. In one example, the pressure sensor can comprise a MEMS pressure sensor with a MEMS pressure diaphragm with an area (A) that can be defined by a lithographic process, which is highly accurate, and the fabrication process, which has a certain manufacturing tolerance or process tolerance. The accuracy of the lithographic area (A) can be sufficient for modelling especially for pressure sensors that have moderate precision requirements, or ones that have a very large geometry compared with the fabrication accuracy of the process. Once the spring constant (δ) is derived, the fabrication distance of the plates (d) can be calculated from one of the electrostatic measurements with only one pressure being known throughout the modelling process. For example, the measurements can be performed under a known ambient pressure in order to achieve a full calibration of the sensor.

In an aspect, an alternative for the evaluation of the area (A) can be based on a measurement at a second different pressure. For example, an optional second pressure measurement point can be introduced in the calibration process with the calibration component 106 for example, which can enable an extraction of a size of the sensor diaphragm. The equations to generate the model for this extraction for the area (A) can be derived. For example, the area (A) and other parameter values can be derived iteratively. For example, the calibration component 106 can configured to re-determine a cavity height (d) and a spring constant (δ) based on a repeated measurement of the sets of capacitance values corresponding to the sets of applied voltages, in which the pressure can comprise an ambient pressure. For example, an area A can be found iteratively by evaluation of both sides of the last equation of the equations 8 below.

$$p_1 = \frac{\delta}{A} \cdot d - \left(\frac{1}{C_1} \cdot \delta \cdot \varepsilon + \frac{C_1^2 \cdot V_1^2}{2 \cdot \varepsilon \cdot A^2}\right) \quad \text{eqns. 8}$$

$$p_2 = \frac{\delta}{A} \cdot d - \left(\frac{1}{C_2} \cdot \delta \cdot \varepsilon + \frac{C_2^2 \cdot V_2^2}{2 \cdot \varepsilon \cdot A^2}\right)$$

$$\delta = -\frac{px + \frac{C_X^2 \cdot V_X^2}{2 \cdot A^2 \cdot \varepsilon}}{\frac{\varepsilon}{C_X} - \frac{d}{A}}$$

$$-\frac{p_1 + \frac{C_1^2 \cdot V_1^2}{2 \cdot A^2 \cdot \varepsilon}}{\frac{\varepsilon}{C_1} - \frac{d}{A}} = -\frac{p_2 + \frac{C_2^2 \cdot V_2^2}{2 \cdot A^2 \cdot \varepsilon}}{\frac{\varepsilon}{C_2} - \frac{d}{A}}.$$

The equations 8 can be computed and operate to converge rapidly, as a good starting point for the model as a computational model can be generated with an area as defined by a layout of the lithographic mask during fabrication processes of the pressure sensor, for example. The equations 8 can be further simplified, as shown in below with equations 9, where the calculations can be done using a force feedback loop, such as a closed force feedback loop, in which the applied voltage can be adapted to obtain the same capacitance measurement C for both different pressures (a first pressure at one point of the membrane and a second pressure at a second point of the membrane). In one aspect, this can be performed, for example, in an initial calibration of the pressure sensor after the fabrication process.

$$p_1 = \frac{\delta}{A} \cdot d - \left(\frac{1}{C} \cdot \delta \cdot \varepsilon + \frac{C^2 \cdot V_1^2}{2 \cdot \varepsilon \cdot A^2}\right) \quad \text{eqns. 9}$$

$$p_2 = \frac{\delta}{A} \cdot d - \left(\frac{1}{C} \cdot \delta \cdot \varepsilon + \frac{C^2 \cdot V_2^2}{2 \cdot \varepsilon \cdot A^2}\right)$$

$$\delta = \frac{px + \frac{C^2 \cdot V_1^2}{2 \cdot A^2 \cdot \varepsilon}}{\frac{\varepsilon}{C} - \frac{d}{A}}$$

$$-\frac{p_1 + \frac{C^2 \cdot V_1^2}{2 \cdot A^2 \cdot \varepsilon}}{\frac{\varepsilon}{C} - \frac{d}{A}} = -\frac{p_2 + \frac{C^2 \cdot V_2^2}{2 \cdot A^2 \cdot \varepsilon}}{\frac{\varepsilon}{C} - \frac{d}{A}}$$

$$A = \frac{\sqrt{2} \cdot C \cdot \sqrt{-\varepsilon \cdot (V_1 - V_2) \cdot (p_1 - p_2) \cdot (V_1 + V_2)}}{2 \cdot \varepsilon \cdot p_1 - 2 \cdot \varepsilon \cdot p_2}$$

A recalibration could be done at any single known pressure (e.g., ambient pressure) since the area of the membrane 306 can be assumed to be not affected by aging, and is thus not an unknown parameter variable for the recalibration anymore after derivation. However, the area may be corrected as a result of the expansion of silicon depending on the die temperature. With this knowledge a recalibration is possible at any time where a known pressure can be determined or an ambient external pressure is determined.

With regard to MEMS pressure sensors in particular, a majority of aging effects are the result of changing stress on the membrane 306. The stress can have two main causes. For example, a first part of this stress could be generated by thermal expansion of different materials (e.g., monocrystalline silicon, polysilicon, silicon oxide, silicon nitride, aluminium, or copper) of the chip itself, and the second part of the stress can be generated by the interface between the chip and the package. A third cause of mechanical stress can arise from mechanical contact between the package and its assembly to the application environment. All causes of stress on the sensor, especially the second cause, can be assumed to change over time, and thus represents the major part of aging effects, which can be addressed or corrected by a recalibration. The effect of the inherent system mechanical stress situation causes a change of the deflection of the membrane under identical pressure and electrostatic driving voltage, even in a force free situation where the distance of the membrane of the sensor should be exactly the fabrication distance d. Explicitly this change can only be the parameter (d) in the simplified model. Therefore This distance can be an approximate distance at the edges of the sensor capacitor where the membrane ends in the solid die, and instead be a virtual position of a movable plate of a plate capacitor model, which equates the capacitance to a value that would be measured in situations where the real sensor is free of pressure and electrostatic force. The recalibration of the distance (d) can be without knowledge of any other pressure other than a known atmospheric or external single pressure. However there is still a strong advantage of the electrostatic force for the recalibration of the sensor, since it can be done with a single known pressure point like the ambient pressure, instead of requiring at least two different pressures for the separation of offset and sensitivity, for example In an aspect, a micromechanical pressure sensor with a membrane that can be deflected by electrostatic forces together can be calibrated and recalibrated by different methods being generated. The calibration, for example, can be based on the reduction of a very complex system to an approximation or model that can be described by simpler equations with a physical background or definition. The recalibration can be further based on this model generated. For example, an area (A) of the pressure sensor diaphragm can be utilized as one parameter that is known to be stable over time and can therefore be excluded from the set of calibration data that has to be recalibrated after aging of the sensor. Thus, a recalibration of the sensor spring constant can be enabled under any condition in the field or in real time subsequent to fabrication and initial calibration. A recalibration of the plate fabrication distance, for example, can be done in response to a single pressure reading or information (in many cases this can be ambient pressure) being determined. Thus, a full recalibration of the sensor is possible at known ambient pressure without applying another pressure to the mounted sensor.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 4:
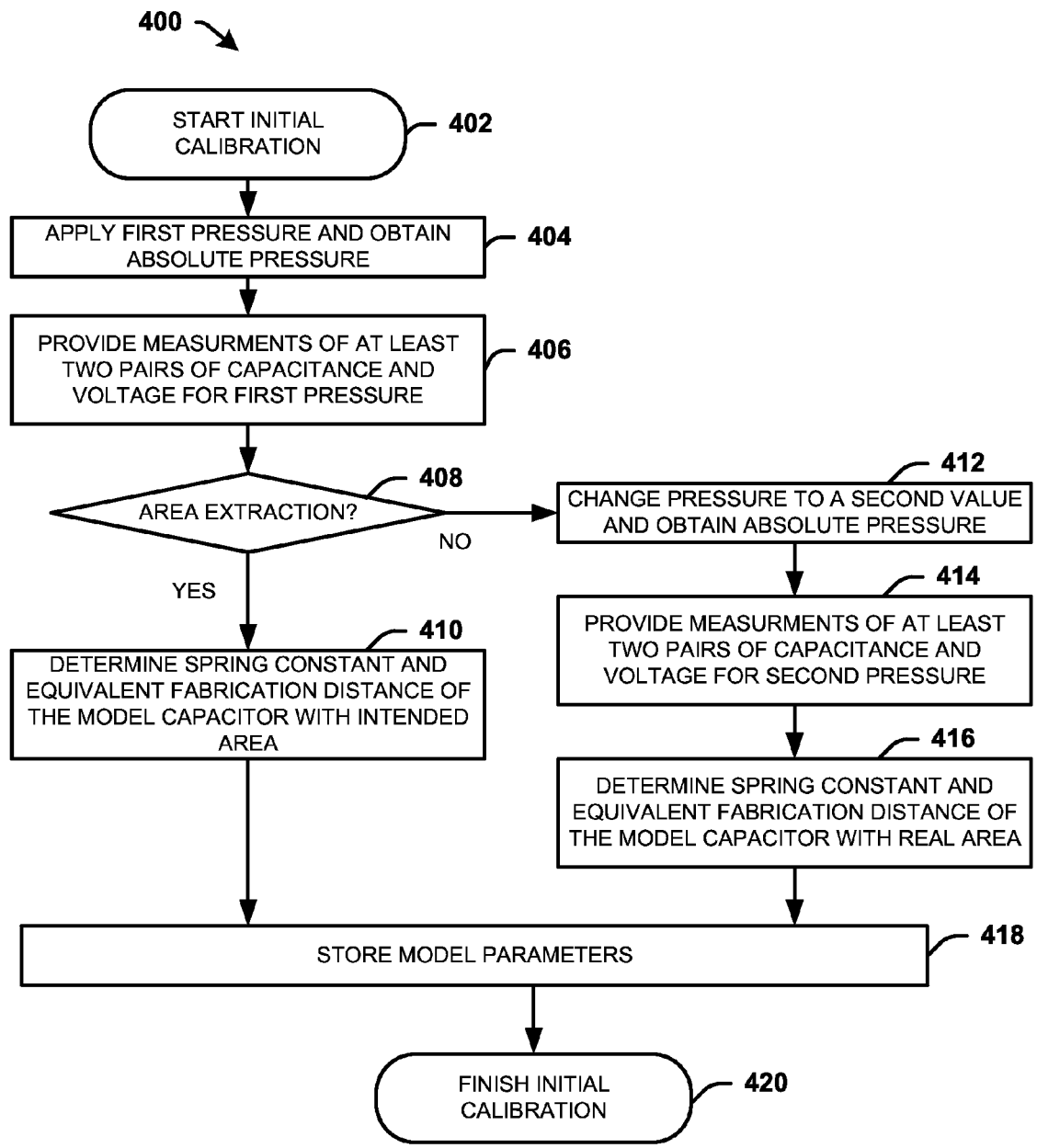
FIG. 4 is a flow diagram illustrating a method of operating a pressure sensor system for calibration and recalibration of a pressure sensor according to various aspects described.

Referring now to FIG. 4, illustrated example flow diagram for a system modeling a pressure sensor in accordance with various aspects. The method 400 initiates at 402 for initial calibration of one or more pressures sensors (e.g., pressure sensor 102) modeled.

At 404, a first pressure can be applied to the sensor and an absolute pressure can be obtained. For example, an absolute pressure can be obtained from an external calculation or reading of an external source or system internal measurement (e.g., the measuring component 104). The pressure, for example can be an atmospheric pressure or a pressure that is induced, for example, by an applied voltage at plates of the sensor or sensor model.

At 406, at least two pairs of measurements are obtained, such as via a processor, a measurement component via a processor, or other measuring device (e.g., the measuring component 104), which can comprise a capacitance and a voltage. The voltage can be induced or applied via the biasing component 202, for example, a voltage source, or other voltage bias component that operates to induce an electrostatic voltage across the sensor membrane (e.g., membrane 306). The pairs comprising a capacitance and a voltage can be performed open loop by changing the sensor bias voltage and measuring the corresponding reaction of the sensor capacitor, or can be evaluated via a feedback loop in multiple iterations without change in the pressure. Because the electrostatic measurement can be done rapidly with a small time differential (e.g., less than a micro second), no change in atmospheric/barometric pressure is presumed and the pressure is constant.

At 408, a determination is generated for whether an area extraction is to be performed for accuracy. Various factors can be involved in the determination, such as a time, a membrane degradation, accuracy within a reduced range, coefficients of components comprising the pressure sensor, whether areas are stored or communicated via a manufacturer device via a communication network or the like. If the determination at 408, is affirmative (YES), the process flow continues at 410 with determining or modeling parameters of the sensor. At 410, for example, one or more spring constants can be determined and a distance of deflection between plates. The distance can be an equivalent fabrication distance (d) of a model plate capacitor, for example, or other model type discussed above. The calculations can be generated with an intended area (A) of the sensor diaphragm, such as a fabrication area within a process tolerance.

If the determination at 408 is negative (NO), the process flow continues at 412 by changing the pressure to a second different pressure value and obtaining a pressure reading, which can be an absolute pressure value, such as that induced by an electrostatic force, for example. At 414, measurements can be obtained or provided of at least two pairs of capacitance and voltage for the second pressure. At 416, parameters can be determined that comprise a spring constant, and a distance, such as a fabrication distance of a modelled capacitor of the sensor. The parameters can be derived, for example, with a real area or one that is measured across the membrane of the sensor. The real area can be the same or different from the intended area discussed above.

At 418, parameters are stored in the computational model generated in a memory coupled to the processor or a component of the system. At 420, calibration (e.g., via the calibration component 106) can be completed with setting target values of the sensor to values that accommodate or recalibrate the sensor for further operation.

In one aspect, the measurements or measurement operations described can be performed at different temperatures and different temperature coefficients with respect to one another, which can be extracted and stored for each parameter. A simplified form of a temperature compensation sequence for the methods described herein could be: first, performing a full calibration for the spring constant ($\delta$) and the area (A) at a known room temperature using two different pressures, or at two different pressures electrostatically induced, and then recalibrate at different temperatures while reusing the values obtained for the plate area from the first measurement with a temperature correction based on the material expansion coefficient of silicon (or any other material used for the sensor). Measurement acts or steps described in this disclosure can also be exchanged in their sequences or can be extracted by a multitude of measurements to increase accuracy by further averaging the values.

Figure 5:
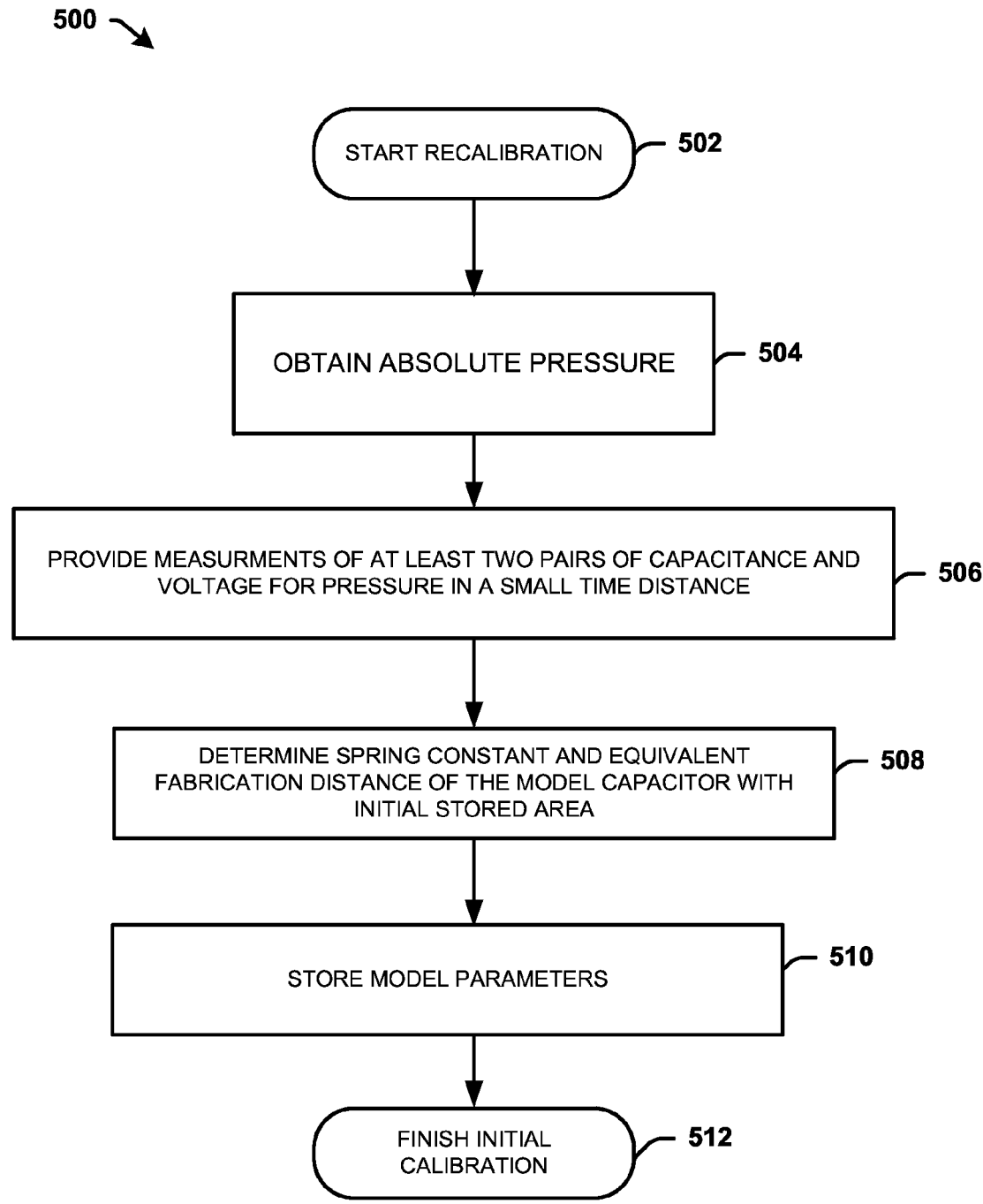
FIG. 5 is a flow diagram illustrating another method of operating a pressure sensor system for calibration and recalibration of a pressure sensor according to various aspects described.

Referring to FIG. 5, illustrates is a method 500 that initiates at 502 with a recalibration of a pressure sensor. At 504, a pressure is measured or obtained, such as from an external source and as an absolute pressure. At 506, measurements are obtained or provided that comprise at least two pairs of capacitance (C) and voltage (V) for the pressure obtain (e.g., absolute pressure). The pressure can be an atmospheric or a barometric pressure. The measurement pairs can be obtained in a time distance that is short enough to assure that pressure does not change in a relevant range between two measurements, for example.

At 508, a spring constant and an equivalent fabrication distance of a model of the capacitor (e.g., a model plate capacitor) can be determined with an area (A) initially stored of the sensor diaphragm. At 510, the parameters determined can be stored, and at 512, the recalibration is completed.

Figure 6:
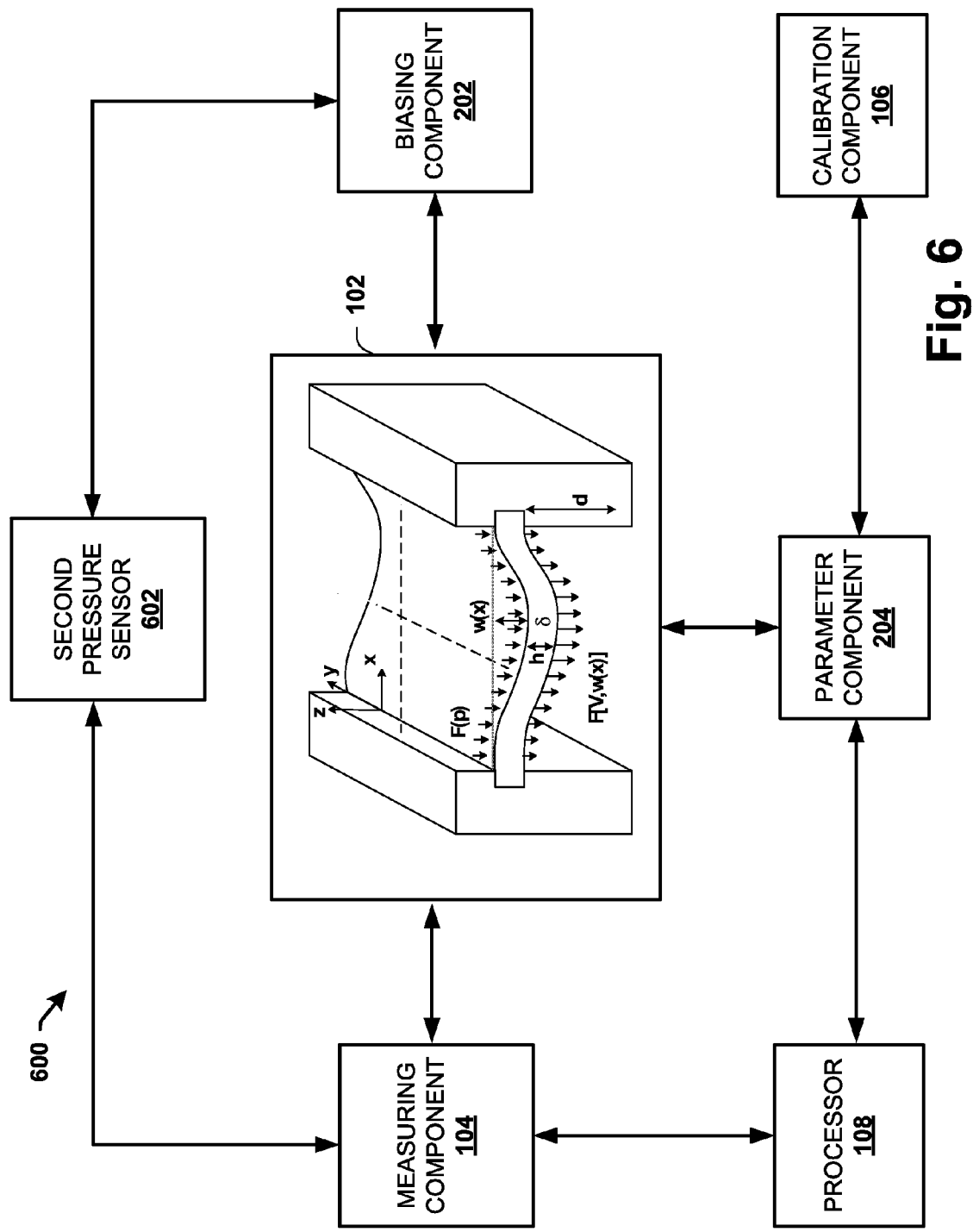
FIG. 6 is a block diagram illustrating another pressure sensor system for calibration and recalibration of a pressure sensor according to various aspects described.

Referring now to FIG. 6, illustrated is an example of a calibration and recalibration system 600 in accordance with various aspects. The system 600 comprises similar components described above, and further comprises an addition or a second pressure sensor 602 that also operates with a membrane or diaphragm that generates a deflection as function of different parameters, including, but not limited to an electrostatic force at a corresponding set of electrodes or at a first electrode terminal and a second electrode terminal (not shown) for both sensors 102 and 602. Although the second pressure sensor 602 is coupled in parallel to the first pressure sensor 102, other configuration or architectures are also envisioned.

The system 600 with the second pressure sensor 602 can dynamically operate to further model one or more pressures sensors 102, 602, and to calibrate and recalibrate the corresponding sensor parameters to target values, which can comprise factory settings after fabrication or different values for operating dynamically in the field during implementation in one or more additional sensor systems or sensor networks.

Aspects described above accompanying the above figures provide for calibration principles based on a generated model of the sensor and the capacitor coupled to the sensor that, in one interpretation, utilize different pressures for a calibration and enable a recalibration in any situation where a pressure is known, such as a single ambient pressure or pressure reading obtained. The system 600 comprises the second pressure sensor 602 and further facilitates calibration of one or more of the pressures sensors with the same model, and by utilizing a single pressure or one pressure reading. The calibration and recalibration, for example, can be performed with the model generated using the ambient pressure on a standard FE/BE test equipment instead of special equipment that allows to apply different pressures. The ambient pressure reading and modeling processes therefore can be done independently of any other pressure or pressure reading, and with the single ambient pressure alone as a dynamic or real time field calibration process.

For example, rather than utilizing two different pressures to characterize a real cell area, or an actual cell area, of the sensor 102, the system 600 can operate to generate a computational model with sensor cells of different areas. The sensors 102 and 602, for example, can exhibit matching characteristics or functioning, or be substantially matched, especially by comprising the same or substantially equal fabrication distance (d), which can include a distance (d) that is between the plates or electrodes of the respective sensors 102, 602.

In an aspect, the first pressure sensor 102 and the second pressure sensor 602 comprise a fabrication tolerance from respective design parameters (Dp) that can be determined, described and modeled by one variable. For example, the single variable can be a technological parameter (Tp), or referred to as a process parameter or the like connotation. The process parameter can be a function of or derived from a manufacturer or manufactured tolerance range. As an example, the pressure sensors 102 and 602 are designed and fabricated as square membranes with a dimensional length, such as side length (x). At least one pressure sensor 102 or 602 can comprise a smaller dimensional side length with respect to the other, and the pressures sensors 102 or 602 can be connected in parallel one or more (nc) times as one or more pressure sensors in order to achieve a comparable capacitance as a larger capacitance of the other sensor (e.g., pressure sensor 102 or 602) such that, for example, the capacitance→Dp1=x1; Dp2=(x2,nc). The process variation could, for example, be the result of an over etching or an under etching of a cavity that is located below the deflectable diaphragm by a distance (Tp=Δ).

Figure 7:
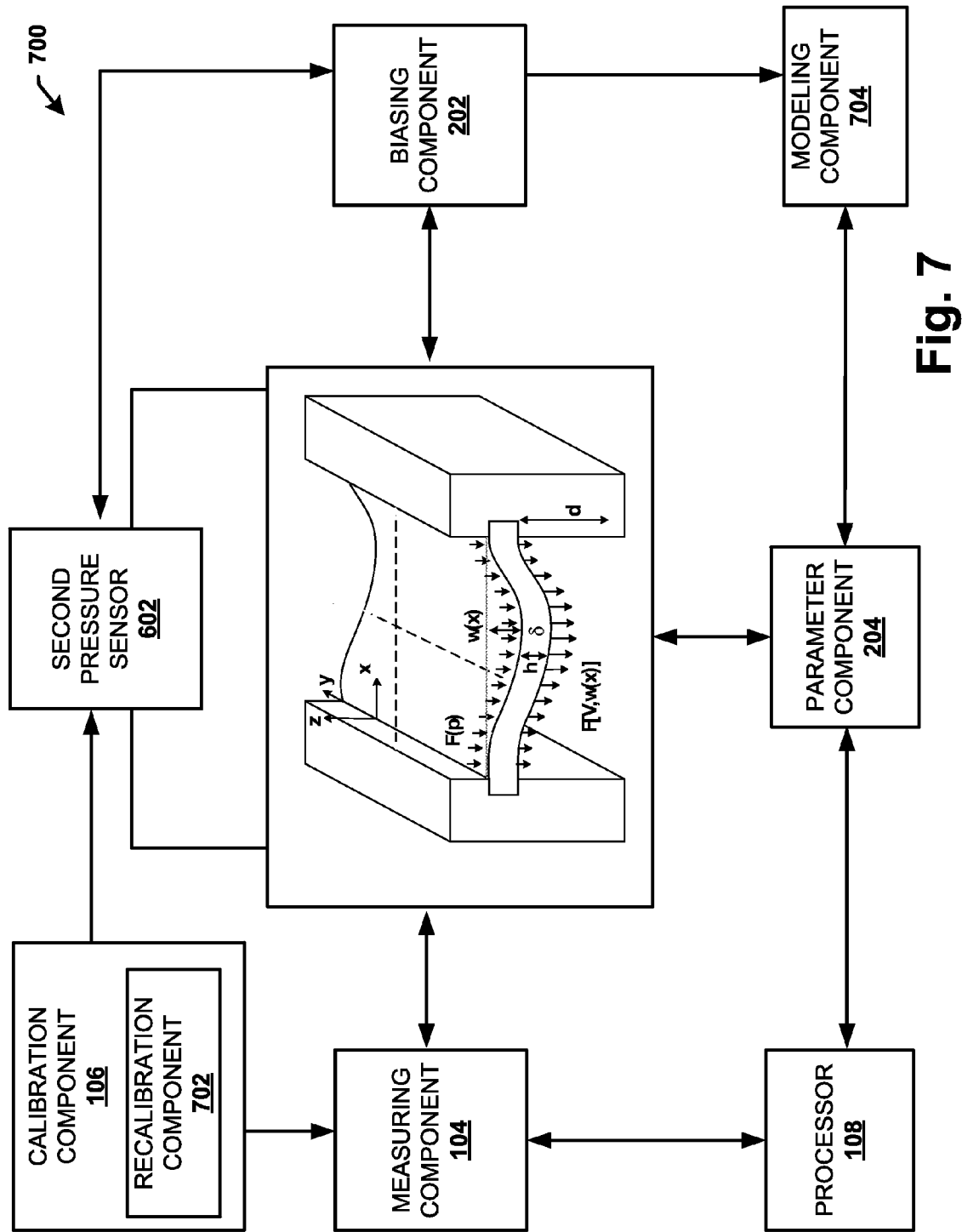
FIG. 7 is a diagram illustrating pressure sensor models for calibration and recalibration of a pressure sensor according to various aspects described.

Referring to FIG. 7, illustrated is a system 700 in accord with one or more aspects disclosed herein. The system 700 comprises a recalibration component 702 and a modeling component 704, for example, in addition to similar components as discussed above.

The recalibration component 702, for example, is configured to recalibrate the set of sensor parameters of one or more sensors coupled in the system according to a model generated via the model component 704. The recalibration and model can be in accordance with aspects described herein. The first pressure sensor 102 can be coupled in parallel with the second pressure sensor 602 and have one or more matching parameters that can enable substantially equal capacitances at a first and a second node or terminal of the parallel configuration of sensors. The first sensor 102 can include a sensor coupled to the second pressure sensor 602, which can include one or more sensors coupled together to equate to a larger capacitance of the first pressure sensor with an applied voltage to the capacitor plates. The recalibration component can be configured to extract the set of sensor parameters or parameter values for the first pressure sensor and the second pressure sensor that comprises a process parameter, which can include a design parameter derived from both the first pressure sensor 102 and the second pressure sensor 602, and further represented by a single variable or process parameter (Tp), a first membrane area of the first sensor 102, a second membrane area of the second sensor 602, a first spring constant of the first membrane and a second spring constant of the second membrane, and a distance between the first plurality of electrodes.

The modeling component 704 is configured to generate a model that can be a computation model, virtual model or a set of codes that imitate function of the sensor in response to an electrostatic voltage according to parameters extracted from the first sensor 102 and/or the second sensor 602. The model can be a simplified virtual or mathematical model that enables rapid extraction of parameter values. The model, for example, can be a capacitance model such as a capacitance bridge based model, a moving plate based model, or other type capacitance model for performing more efficient calibrations and recalibrations for one or more pressure sensors 102 or 602. The model component can be configured to model the displacement of one or more membrane of the sensors 102, 602 within a reduced operating range. For example, the displacement can be characterized by a non-linear function of an actual configuration of the pressure sensor and a two dimensional deflection curve at the electrodes of the sensor. Capacitance values generated by corresponding applied voltages can be derived from a differential output utilized to model different parameters of the pressure sensor in the model. The capacitive bridge model can operate to model the values based on parameters derived across the electrodes of the sensor(s). In one aspect, the model can comprise a plate capacitor with at least two plates comprising a distance that changes depending on applied pressure springs that resist the displacement and an electrostatic force being induced.

Figure 8A:
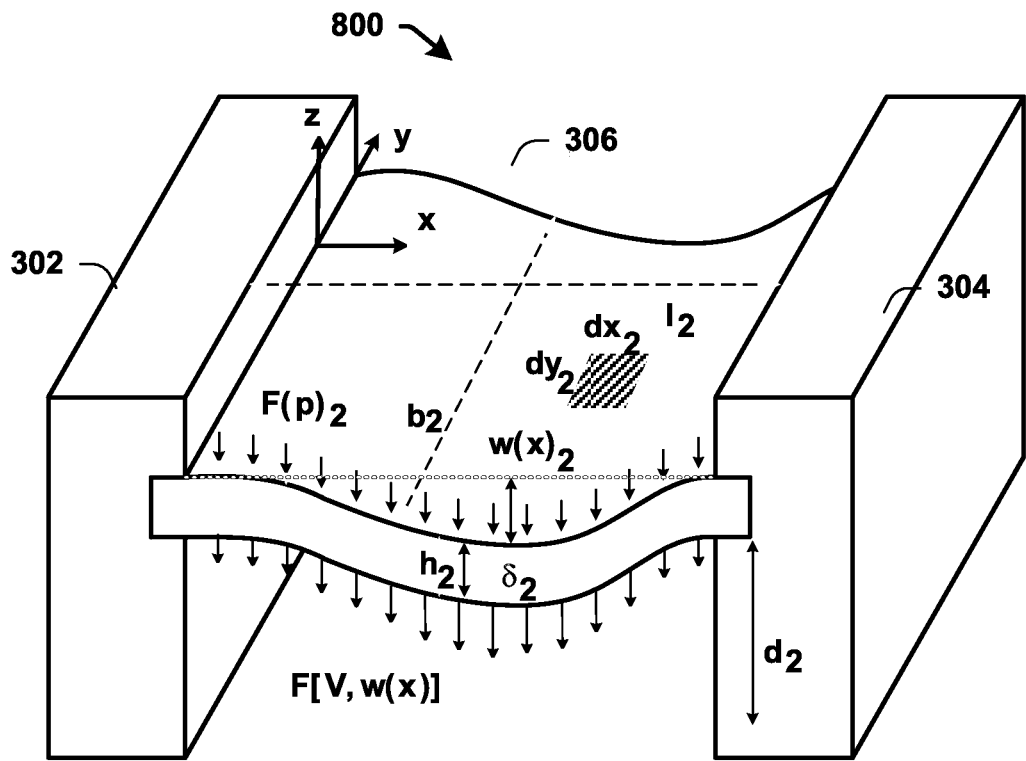
FIGS. 8A-8B are diagrams illustrating another pressure sensor system for calibration and recalibration of a pressure sensor according to various aspects described.
Figure 8B:
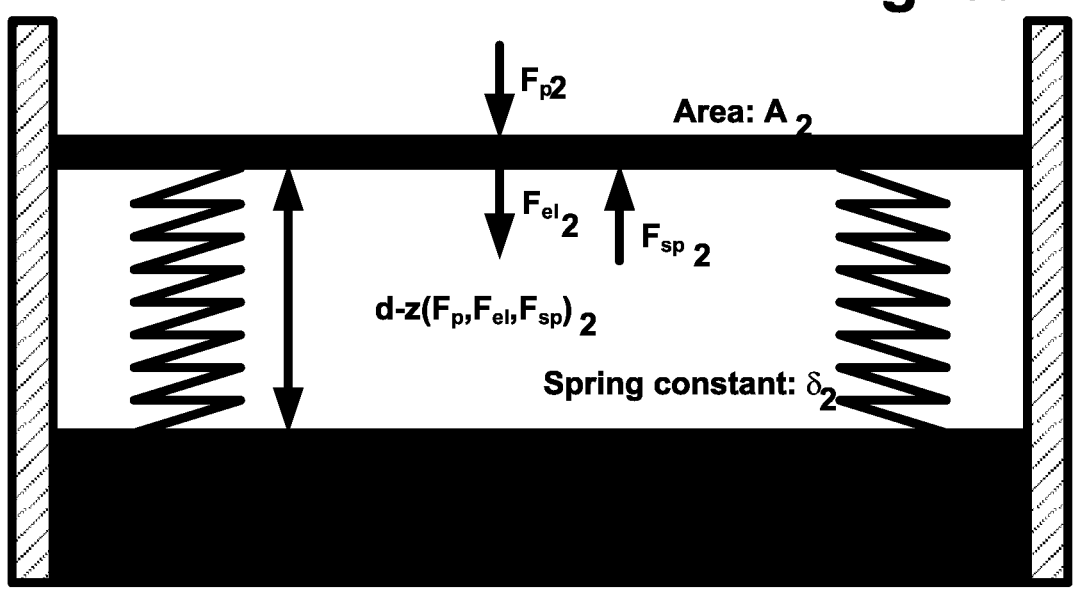

Referring to FIGS. 8A and 8B, illustrated are example model configurations 800 and 830, or architectures of a second sensor and described further in conjunction with reference to elements of FIGS. 3A and 3B. The first pressure sensor 102 and the second pressure sensor 602 can each comprise a dimensional length along a first side (b, b2), for example, of the sensor. The sensor 102 and 602, for example, can include a modeled first and second membrane area A and A2 that is a function of dy, dx or dy2 and dx2. The first dimensional length can be different than the second dimensional length of the other sensor. Both sensors can comprise a height h and h2 that negligibly differs as a function of the process parameter. A distance can be represented further as the different between the deflection of the membrane along a z-axis and the cavity bottom or bottom of the electrodes that can vary depending upon a bending function based on the applied pressures spring that resist the displacement of the electrostatic force generated.

The calibration component 106 can operate to determine, with respect to the first pressure sensor and the second pressure sensor, an estimated process parameter that is derived from a manufactured tolerance range. A set of estimated areas of the first membrane and the second membrane can be derived based on the estimated process parameter, and a set of estimated spring constants can be derived from the set of estimated areas. In addition, the model can generate these estimations including an estimated cavity height that is valid for the first pressure sensor and the second pressure sensor according to or for good matching characteristics between the two sensors. The calibration component 106 is further configured to re-determined the estimated process parameter based on the estimated cavity height to determine an actual process parameter, a first membrane area of the first membrane and a second membrane area of the second membrane based on the actual process parameter, a first spring constant of the first membrane and a second spring constant of the second membrane, and/or a distance between the first plurality of electrodes and the second plurality of electrodes.

Both sensors cells 102 and 602, for example, can be characterized by two pairs of electrostatic driving voltages and corresponding capacitances. The modeling component can facilitate a modeling of the sensor parameters according one or more of the equations described above and below for example.

$$A_1 = F(D_{p1} \cdot Tp) \quad \text{eqns. 10}$$
$$A_1 = (x_a + \Delta)^2$$
$$\delta_a(\Delta) = \frac{1}{2 \cdot \varepsilon^2 \cdot [(x_a + \Delta)^2]^2} \cdot \frac{C_{1a}^3 \cdot C_{2a} \cdot V_{1a}^2 - C_{1a} \cdot C_{2a}^3 \cdot V_{2a}^2}{C_{1a} - C_{2a}}$$
$$p = \frac{\delta_a(\Delta)}{(x_a + \Delta)^2} \cdot d - \left[\frac{1}{C_{1a}} \cdot \delta_a(\Delta) \cdot \varepsilon + \frac{C_{1a}^2 \cdot V_{1a}^2}{2 \cdot \varepsilon \cdot [(x_a + \Delta)^2]^2}\right]$$
$$d_a(\Delta) = \frac{(\alpha * \Delta + x_a)^2 \cdot \left[p + \frac{\varepsilon \cdot \delta_a(\Delta)}{C_{1a}} + \frac{C_{1a}^2 \cdot V_{1a}^2}{2 \cdot \varepsilon \cdot (\Delta + x_a)^4}\right]}{\delta_a(\Delta)}.$$

$$A_2 = F(D_{p2}, Tp) \quad \text{eqns. 11}$$
$$A_2 = nc \cdot (x_b + \Delta)^2$$
$$\delta_b(\Delta) = \frac{1}{2 \cdot \varepsilon^2 \cdot [nc \cdot (x_b + \alpha * \Delta)^2]^2} \cdot \frac{C_{1b}^3 \cdot C_{2b} \cdot V_{1b}^2 - C_{1b} \cdot C_{2b}^3 \cdot V_{2b}^2}{C_{1b} - C_{2b}}$$
$$p = \frac{\delta_b(\Delta)}{nc \cdot (x_b + \alpha^*\Delta)^2} \cdot d - \left[\frac{1}{C_{1b}} \cdot \delta_b(\Delta) \cdot \varepsilon + \frac{C_{1b}^2 \cdot V_{1b}^2}{2 \cdot \varepsilon \cdot [nc \cdot (x_b + \Delta)^2]^2}\right].$$
$$d_b(\Delta) = \frac{(\Delta + x_b)^2 \cdot \left[p + \frac{\varepsilon \cdot \delta_b(\Delta)}{C_{1b}} + \frac{C_{1b}^2 V_{1b}^2}{2 \cdot \varepsilon \cdot nc^2 \cdot (\Delta + x_b)^4}\right]}{\delta_b(\Delta)}.$$

$$d_a(\Delta) \stackrel{!}{=} d_b(\Delta). \quad \text{eqns. 12}$$

With a determined or known area, the models 800, 830 can enable calculation of both spring constants, which are different due to the different geometries among the sensors that can make the diaphragms smaller or stiffer. In situations where the area, is not determined or still unknown, since it can depend on the technological variation ($\Delta$) or process parameter, the modeling process can utilize the models to initiate from a known range of the technology parameter ($\Delta$). The calculated spring constants derived can be consequently inaccurate as well since the technological variation is an estimated parameter. The ambient pressure (p) can be ascertained from a pressure reading or a source (e.g., a reference barometer or other component), which enables calculation of an estimate for the cavity height (da, db) and also includes an inaccuracy due to dependence on the estimated spring constant and the estimated area. Starting from the results of (da) and (db), which can be different, the estimates can be updated for the technology parameter ($\Delta$) and recalculated for an actual parameter value such as with (da) and (db), unless they are determined to be sufficiently equal. This modeling process can yield the real or actual values for the process or technology parameter ($\Delta$), the areas (A1, A2), the spring constants ($\delta 1$, $\delta 2$), and the distance (d=da=db), which can be the real/actual fabrication distance between the two sensor plates of one or more of the sensors 102, 602.

A recalibration via the recalibration component 702 can be performed at any single known pressure (e.g., ambient pressure) since the area of the membrane can be assumed to be not affected by aging, and thus not necessarily an unknown for the recalibration process. However it may be corrected due to alterations by the expansion of silicon depending on the die temperature. With this knowledge a recalibration is possible at any time where a known pressure can be delivered.

Based on this invention, the previously described recalibration at known ambient conditions can be extended and can be done in the same way as the initial calibration described in other aspects above. With the use of the sensors 102 and 602 having matched cavity heights and different areas, the extraction of all unknown variables such as the technology parameter ($\Delta$), the areas (A1, A2), the spring constants ($\delta 1$, $\delta 2$) and the distance (d) is possible.

The model generated via the modelling component 704 for calibration and recalibration enables a different recalibration independent of ambient pressure based on the two different areas of the sensor cells, in which the respective areas A1 and A2 of the first and second sensors 102, 602 are unchanged or can be corrected by known expansion coefficients. The parameters can be derived via the model with a measurement pair of a driving voltage and its corresponding capacitance from each sensor cell. In response to the two measurement pairs being acquired under the same pressure conditions (e.g., same barometric pressure), which should be easily fulfilled if the measurements are done simultaneously or in a short time distance, then a computation and calibration can be done by directly calculated the distance (d) from the below equations. For greater accuracy of the recalibration, a further recalibration or iteration of calibration computation can be performed for the spring constants ($\delta 1$, $\delta 2$) of each sensor cell before the update of the distance (d) is calculated. An advantage of the sensor recalibration system is that it allows repeating the recalibration continuously in the background of a field or system application and it reduces temperature compensation to the correction of the area expansion of the diaphragm, which is small and well defined by known and stable expansion coefficients.

$$p_1 = \frac{\delta_1}{A_1} \cdot d - \left(\frac{1}{C_1} \cdot \delta_1 \cdot \varepsilon + \frac{C_1^2 \cdot V_1^2}{2 \cdot \varepsilon \cdot A_1^2}\right) \quad \text{eqns. 13}$$
$$p_2 = \frac{\delta_2}{A_2} \cdot d - \left(\frac{1}{C_2} \cdot \delta_2 \cdot \varepsilon + \frac{C_2^2 \cdot V_2^2}{2 \cdot \varepsilon \cdot A_2^2}\right)$$
$$\frac{\delta_1}{A_1} \cdot d - \left(\frac{1}{C_1} \cdot \delta_1 \cdot \varepsilon + \frac{C_1^2 \cdot V_1^2}{2 \cdot \varepsilon \cdot A_1^2}\right) =$$
$$\frac{\delta_2}{A_2} \cdot d - \left(\frac{1}{C_2} \cdot \delta_2 \cdot \varepsilon + \frac{C_2^2 \cdot V_2^2}{2 \cdot \varepsilon \cdot A_2^2}\right)$$
$$2 \cdot \delta_1 \cdot A_1^2 \cdot A_2^2 \cdot C_2 \cdot \varepsilon^2 - 2 \cdot \delta_2 \cdot A_1^2 \cdot A_2^2 \cdot C_1 \cdot \varepsilon^2 -$$
$$d = \frac{A_1^2 \cdot C_1 \cdot C_2^3 \cdot V_2^2 + A_2^2 \cdot C_1^3 \cdot C_2 \cdot V_1^2}{2 \cdot A_1 \cdot A_2 \cdot C_1 \cdot C_2 \cdot \varepsilon \cdot (A_2 \cdot \delta_1 - A_1 \cdot \delta_2)}.$$

With the above set of equations 13, a change in the area of the membrane or sensor diaphragm can cause a change of corresponding spring constants and capacitance of the sensor. The systems describe herein with at least two different sensors can facilitate determining parameters of a model, which is used for calibration by applying self-generated electrostatic forces under one or more known ambient pressure conditions, and avoids the need of testing at different pressures; thus allow a calibration on a standard unmodified tester. Further it allows a recalibration of the parameters that are subject to temperature and aging drift under any operation condition even without knowledge of an actual pressure, such as a pressure at the sensor or additional pressure forces.

In addition, different models of the technologically induced fabrication variation models of the sensor area can be utilized by the system. For example, the previously used over/under etching model discussed above could be extended by introduction of a scale factor (α) that makes the under etching dependent on the ratio of the different cell geometries.

$$A_1 = F(D_{p1}, Tp) \quad A_2 = F(D_{p2}, Tp)$$

$$A_1 = (x_a + \Delta)^2 \quad A_2 = nc \cdot (x_b + \alpha\Delta)^2 \quad \text{eqns. 14.}$$

The scale factor (α) is a constant that can be calculated from the design geometries (xa) and (xb) by a known rule. For this case the calibration could happen without any modification of the sensor model. Another example might be different over/under etching parameter depending on the orientation of the sensor cell with respect to the crystal directions such as with the following equations:

$$A_1 = F(D_{p1}, Tp) \quad A_2 = F(D_{p2}, Tp)$$

$$A_1 = (x_a + \Delta_x) \cdot (x_a + \Delta_y) \quad A_2 = nc \cdot [(x_b + \Delta_x) \cdot (x_b + \Delta_y)] \quad \text{eqns. 15.}$$

In the above case, two spreading technology parameters or process parameters could be utilized and the system can be extended to use three different sensors configured with at least some matching parameters and some varying dimensions or other parameters. For example, iterations can be performed to derive identical results for the fabrication height of the cavity (d), which is identical for all three sensor types, and can be calculated as a function of two dimensions (Δx) and (Δy).

In addition, other parameters of the sensor cells that do not directly influence the area of the diaphragm can be varied as well. This could for example be the thickness of the diaphragm and would result in sensors that have different spring constants. In this case the sensor cells have the same area and the iterations could be done directly in (A) within the common unknown area of both sensor cells.

The diaphragm of one cell could be stabilized by a oxide pillar in the middle of the cell, which would result in a different sensitivity for the same area as well as in the case with the thicker membrane above and can be handled in the same manner of an iterative determination of the fabrication height (d) of the cavity by variation of (A) as long as the result of (d) matches for both cells. Furthermore, combinations of different area, height and stabilized membranes with oxide pillars located below are possible.

If the sensitivity of one of the membranes is reduced so far that the capacity can be assumed to be constant within the pressure range, the procedure can be simplified, because a sensitivity adjustment would no longer be necessary for these sensor cells. In this case, the cells can serve as reference cells that are pressure independent and therefore they can be used for the extraction of cavity height and area based on the technology fabrication spread parameter as follows with the set of equations 16:

$$A_1 = (x_a + \Delta)^2 \quad \text{eqns. 16}$$

$$A_2 = nc \cdot (x_b + \Delta)^2$$

$$\delta_a(\Delta) = \frac{1}{2 \cdot \varepsilon^2 \cdot [(x_a + \Delta)^2]^2} \cdot \frac{C_{1a}^3 \cdot C_{2a} \cdot V_{1a}^2 - C_{1a} \cdot C_{1a}^3 \cdot V_{2a}^2}{C_{1a} - C_{2a}}$$

$$\delta_b = \infty \text{ Huge spring constant}$$

$$p = \frac{\delta_a(\Delta)}{(x_a + \Delta)^2} \cdot d - \left[ \frac{1}{C_{1a}} \cdot \delta_a(\Delta) \cdot \varepsilon + \frac{C_{1a}^2 \cdot V_{1a}^2}{2 \cdot \varepsilon \cdot [(x_a + \Delta)^2]^2} \right]$$

-continued $$d_a(\Delta) = \frac{(\alpha * \Delta + x_a)^2 \cdot \left[ p + \frac{\varepsilon \cdot \delta_a(\Delta)}{C_{1a}} + \frac{C_{1a}^2 \cdot V_{1a}^2}{2 \cdot \varepsilon \cdot (\Delta + x_a)^4} \right]}{\delta_a(\Delta)}$$

$$d_b = nc \cdot (s_b * \Delta)^2 \cdot \frac{\varepsilon}{C_1}.$$

By extending this approach to use two pressure insensitive cell types in addition to the pressure sensitive one that shall be calibrated, the calculation of the fabrication spread due to over/under etching can be further simplified and especially adapted to provide a good resolution for the calculation of the cavity height, independent of taking into account the sensitivity of the cells.

$$A_2 = nc \cdot (x_b + \Delta)^2 \quad \text{eqns. 17}$$

$$A_3 = nc \cdot (x_c + \Delta)^2$$

$$\delta_b = \infty$$

$$\delta_c = \infty$$

$$d_b = nc_b \cdot (x_b + \Delta)^2 \cdot \frac{\varepsilon}{C_2}$$

$$d_c = nc_c \cdot (x_c + \Delta)^2 \cdot \frac{\varepsilon}{C_3}$$

$$nc_b \cdot (x_b + \Delta)^2 \cdot \frac{\varepsilon}{C_2} = nc_c \cdot (x_c + \Delta)^2 \cdot \frac{\varepsilon}{C_3}$$

$$\Delta = \frac{C_2 \cdot C_3 \cdot \left[ \frac{(x_b - x_c) \cdot \sqrt{\frac{nc_b \cdot nc_c}{C_2 \cdot C_3}} +}{2 \cdot C_3 \cdot nc_b \cdot x_b - 2 \cdot C_2 \cdot nc_c \cdot x_c} \right]}{C_2 \cdot nc_c - C_3 \cdot nc_b} .$$

Additionally, the recalibration could be further simplified by the above computational model approach as well in eqns. 17, since the pressure independent cells can be used for a determination of the cavity height and the fabrication dependent area at any time, completely independent of the actual pressure.

Finally, as noted above, each of the "sensor cells" or pressure sensors (e.g., pressure sensors 102, 602) that are modeled can comprise an array of smaller elementary sensor cells, can also include a capacity difference between arrays of a first elementary type cell and a second elementary type cell as this can be generated or modeled by a capacitive Wheatstone bridge.

Figure 9:
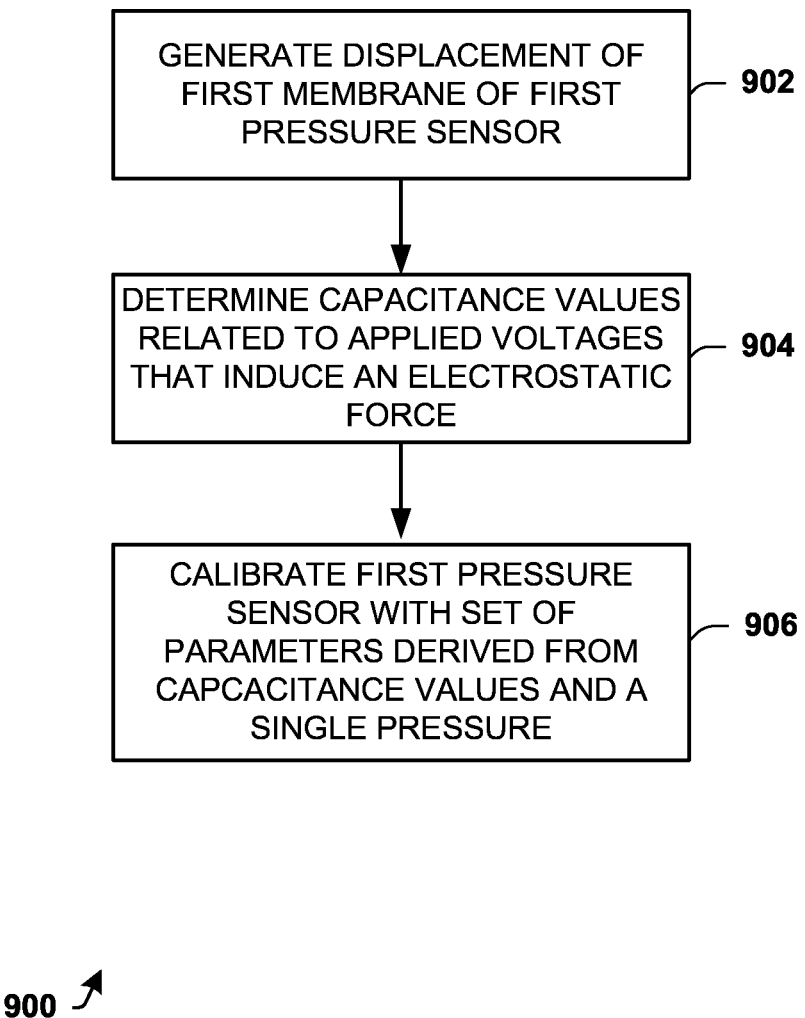
FIG. 9 is a flow diagram illustrating a method of operating a pressure sensor system for calibration and recalibration of a pressure sensor according to various aspects described.

Referring now to FIG. 9, illustrated is a method 900 for pressure sensor calibration and recalibration in sensor systems. At 902, the method includes generating (e.g., via a biasing component 202) a displacement of a first membrane of a first pressure sensor as a function of one or more electrostatic forces. At 904, the method comprises measuring a set of capacitance values that correspond to a set of applied voltages at a first plurality of electrodes at a first pressure. At 906, the first pressure sensor is calibrated to a set of target values with a set of sensor parameters derived from the set of capacitance values that correspond to the set of applied voltages and the first pressure.

In an aspect, the method can comprise generating a computational model for sensor calibrations by estimating an estimated process variation parameter that is related to the first pressure sensor and to a second pressure sensor that is also measured and calibrated as the first pressure sensor. Estimated areas and spring constants can be determined that correspond to the first pressure sensor and the second pressure sensor based on the estimated process variation parameter. Then estimated heights of the first membrane of the first pressure sensor and a second membrane of the second pressure sensor can be derived. The set of sensor parameters can then be recalculated by iterations to the set of target values independent of an actual pressure reading, wherein the first pressure comprises an ambient pressure.

Figure 10:
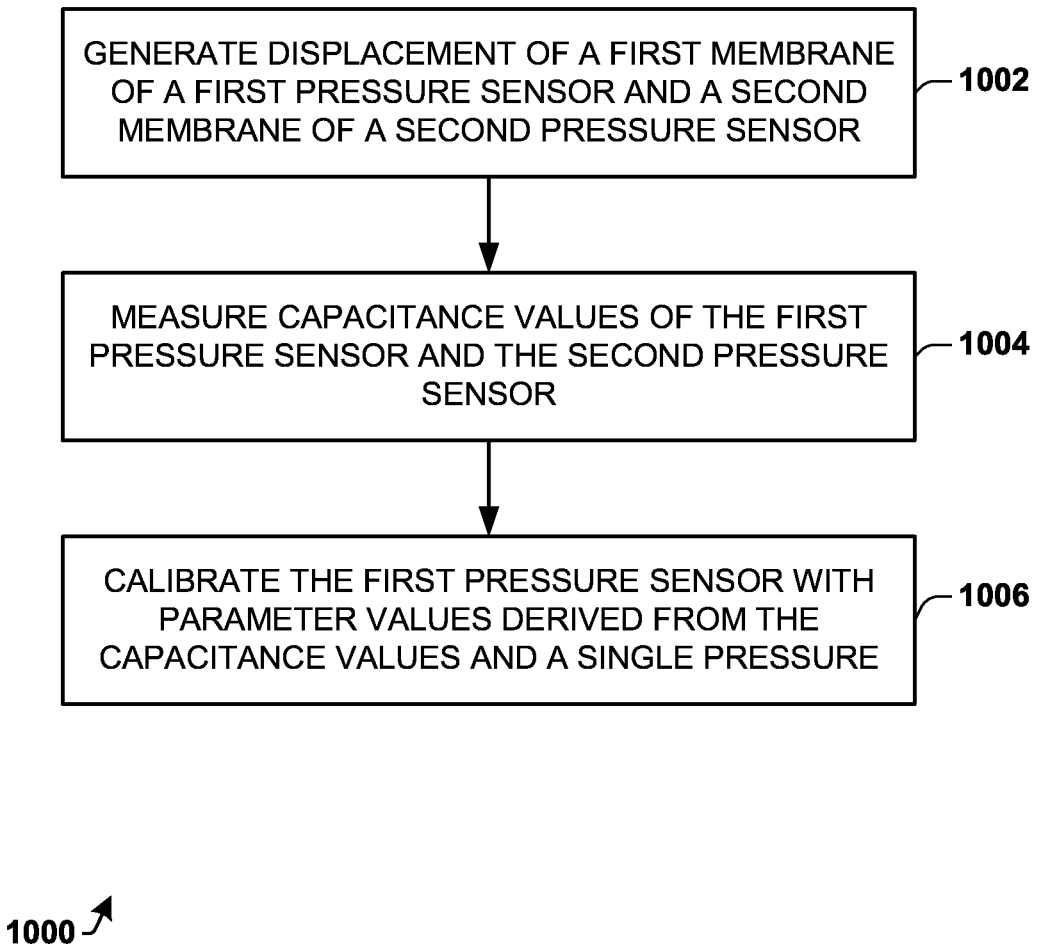
FIG. 10 is a flow diagram illustrating another method of operating a pressure sensor system for calibration and recalibration of a pressure sensor according to various aspects described.

Referring to FIG. 10, illustrated is an example process flow for calibration and recalibration of a sensor in accordance with various aspects. The method 1000, initiates at 1002 by generating a displacement of a first membrane of a first pressure sensor and a second membrane of a second pressure sensor. At 1004, capacitance values are measured at the first pressure sensor and the second pressure sensor. At 1006, the first pressure sensor is calibrated with parameter values derived from the capacitance values measured and a single or first pressure (e.g., an atmospheric or ambient pressure).

The term "computer readable media" as used herein includes computer readable storage media and communication media. Computer readable storage media includes volatile and nonvolatile, removable and non-removable media implemented in any method or technology for tangible storage of information such as computer readable instructions or other data. Data stores or memory disclosed herein are examples of computer readable storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

The term "computer readable media" may also include communication media. Communication media typically embodies computer readable instructions or other data that can be communicated in a "modulated data signal" such as a carrier wave or other transport mechanism and includes any information delivery media. The term "modulated data signal" may include a signal that has one or more of its characteristics set or changed in such a manner as to encode information in the signal.

One or more of the operations described can constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A pressure sensor calibration system comprising:
   a first pressure sensor comprising a first plurality of electrodes and a first membrane configured to generate a displacement from a first position to a second position as a function of an electrostatic force;
   a measuring component configured to determine measurements of sets of capacitance values corresponding to sets of applied voltages at the first plurality of electrodes and by the displacement of the first membrane as the function of the electrostatic force; and
   a calibration component configured to calibrate the first pressure sensor to a set of target values with a set of sensor parameters derived from the measurements of the sets of capacitance values and a first pressure;
   wherein the first plurality of electrodes comprise electrodes bridging at least one other pressure sensor comprising different parameters of operation for the displacement by the first pressure or the electrostatic force.

2. The system of claim 1, wherein the first plurality of electrodes form a capacitive full bridge, wherein the sets of applied voltages are applied at an input pair of nodes of the capacitive full bridge, and the sets of capacitance values comprise differential output capacitance values of the capacitive full bridge acquired at an output pair of nodes of the capacitive full bridge.

3. The system of claim 1, further comprising:
   a biasing component configured to generate a bias voltage to the first plurality of electrodes and facilitate control of the displacement of the first membrane with the electrostatic force via an open loop control path by modifying the bias voltage, wherein the measuring component is further configured to measure the sets of capacitance values corresponding to the sets of applied voltages at a first time and a second time according to a time differential, or simultaneously among the first pressure sensor and a second pressure sensor that comprises a second set of sensor parameters matched to the first pressure sensor.

4. The system of claim 1, further comprising:
   a parameter component configured to determine the set of sensor parameters based on a model generated by a model component that is configured to model the displacement of the first membrane from the first position to the second position within a reduced operating range, wherein the displacement is characterized by a nonlinear function of an actual configuration of the first pressure sensor and a two dimensional deflection curve of the first plurality of electrodes.

5. The system of claim 4, wherein the model comprises a plate capacitor comprising at least two plates comprising a distance that changes depending on applied pressure springs that resist the displacement and the electrostatic force.

6. The system of claim 4, further comprising:
a biasing component configured to generate a bias voltage to the first plurality of electrodes and facilitate control of the displacement of the first membrane with the electrostatic force via a closed loop feedback path according to the set of sensor parameters, wherein the set of sensor parameters comprises a first membrane area and the first pressure comprises an ambient pressure.

7. The system of claim 4, wherein the calibration component is further configured to re-determined a cavity height and a spring constant based on a repeated measurement of the sets of capacitance values corresponding to the sets of applied voltages, the first pressure comprising an ambient pressure and an area of the first plurality of electrodes that is known from an initial calibration.

8. The system of claim 4, further comprising:
a second pressure sensor, as the at least one other pressure sensor, configured to bridge the first pressure sensor to provide a capacitance that is approximately equal to the first pressure sensor, and comprising:
  a second plurality of electrodes; and
  a second membrane configured to displace from one position to another position.

9. The system of claim 8, wherein the first pressure sensor comprises:
a first dimensional length along a first side of the first membrane;
a first membrane area; and
a first height from the first membrane to a bottom surface of a first cavity located underneath the first membrane; and
the second pressure sensor comprises:
a second dimensional length along a second side of the second membrane that is different from the first dimensional length;
a second membrane area; and
a second height that negligibly differs from the first height as a function of a process parameter.

10. The system of claim 8, wherein the calibration component is further configured to determine, with respect to the first pressure sensor and the second pressure sensor, an estimated process parameter derived from a manufactured tolerance range, a set of estimated areas of the first membrane and the second membrane based on the estimated process parameter, a set of estimated spring constants derived from the set of estimated areas, and an estimated cavity height that is valid for the first pressure sensor and the second pressure sensor.

11. The system of claim 10, wherein the calibration component is further configured to re-determined the estimated process parameter based on the estimated cavity height to determine an actual process parameter, a first membrane area of the first membrane and a second membrane area of the second membrane based on the actual process parameter, a first spring constant of the first membrane and a second spring constant of the second membrane and an equal distance between the first plurality of electrodes and the second plurality of electrodes.

12. The system of claim 4, further comprising:
a recalibration component configured to recalibrate the set of sensor parameters of the first pressure sensor comprising a capacitance with a second pressure sensor, as the at least one other pressure sensor, bridging the first pressure sensor, wherein the second pressure sensor comprises:
a second plurality of electrodes configured to provide the capacitance;
a second membrane having a second membrane area that is different than a first membrane area of the first membrane of the first pressure sensor; and
a second cavity height of a second cavity located underneath the second membrane and equal to a first cavity height of a first cavity located underneath the first membrane of the first pressure sensor;
wherein the recalibration component is further configured to extract the set of sensor parameters for the first pressure sensor and the second pressure sensor that comprise a process parameter, the first membrane area, the second membrane area, a first spring constant of the first membrane and a second spring constant of the second membrane, and a distance between the first plurality of electrodes.

13. The system of claim 4, wherein the calibration component is further configured to determine an initial parameter of the set of sensor parameters derived from the measurements of the sets of capacitance values and the sets of applied voltages at the first pressure and at a second pressure, and utilize the initial parameter to further derive other parameters of the set of sensor parameters for an initial calibration of the first pressure sensor.

14. A method for calibrating a pressure sensor comprising:
generating, via a biasing component, a displacement of a first membrane of a first pressure sensor as a function of one or more electrostatic forces;
measuring a set of capacitance values that correspond to a set of applied voltages at a first plurality of electrodes at a first pressure;
calibrating the first pressure sensor to a set of target values with a set of sensor parameters derived from the set of capacitance values that correspond to the set of applied voltages and the first pressure;
deriving a process variation parameter related to the first pressure sensor and a second pressure sensor based on a difference of a first area of the first membrane and a second area of a second membrane of a second pressures sensor, and the set of capacitance values; and
extracting unknown sensor parameters from the first pressure sensor and the second pressure sensor as a function of the process variation parameter.

15. The method of claim 14, further comprising:
estimating an estimated process variation parameter that is related to the first pressure sensor and to the second pressure sensor that is also measured and calibrated as the first pressure sensor;
determining estimated areas and spring constants that correspond to the first pressure sensor and the second pressure sensor based on the estimated process variation parameter; and
determining estimated heights of the first membrane of the first pressure sensor and the second membrane of the second pressure sensor.

16. The method of claim 14, further comprising:
recalibrating the set of sensor parameters to the set of target values independent of an actual pressure reading, wherein the first pressure comprises an ambient pressure.

17. The method of claim 14, further comprising:
generating a model of the displacement of the first membrane within a reduced operating range based on a nonlinear function of an actual configuration of the first pressure sensor.

18. The method of claim 17, further comprising:
determining an area parameter of the set of sensor parameters derived from measurements of the set of capacitance values and the set of applied voltages at the first pressure and at a second different pressure; and
utilizing the area parameter to further derive other parameters of the set of sensor parameters for an initial calibration of parameters for the first pressure sensor.

19. A method for calibrating a pressure sensor comprising:
generating, via a biasing component, a displacement of a first membrane of a first pressure sensor as a function of one or more electrostatic forces;
measuring a set of capacitance values that correspond to a set of applied voltages at a first plurality of electrodes at a first pressure;
calibrating the first pressure sensor to a set of target values with a set of sensor parameters derived from the set of capacitance values that correspond to the set of applied voltages and the first pressure;
determining an estimated process variation parameter for the first pressure sensor and a second pressure sensor as a function of a fabrication tolerance;
estimating a set of parameters for the first pressure sensor and the second pressure sensor; and
updating the estimated process variation parameter based on a known ambient pressure as the first pressure and differences between at least one of the set of parameters among the first pressure sensor and the second pressure sensor.

20. A system comprising:
a first pressure sensor comprising a first plurality of electrodes and a first membrane with a first area, wherein the first membrane is configured to generate a displacement as a function of an electrostatic charge generated by applied voltages at the first plurality of electrodes;
a calibration component configured to calibrate the first pressure sensor to a set of target values with a set of sensor parameters derived from measurements of capacitance values from the applied voltages and a first pressure;
a parameter component configured to determine the set of sensor parameters according to a capacitor model that is configured to model the displacement of the first membrane within a lower operating range than a field operating range, determine an estimated process variation parameter as a function of a set of fabrication tolerances of the first pressure sensor and a second pressure sensor and as a part of the capacitor model, estimate a set of estimated sensor parameters related to the first pressure sensor and the second pressure sensor, and re-determine the estimated process variation parameter as an actual process variation parameter based on the set of estimated sensor parameters, wherein the displacement is characterized by a nonlinear function of a real configuration of the first plurality of electrodes and a two dimensional deflection curve of the first plurality of electrodes.

21. The system of claim 20, wherein the first membrane overlays a first cavity of the first pressure sensor that comprises a first height between and is matched with a second height of a second membrane of the second pressure sensor for determining the actual process variation parameter.

22. The system of claim 20, further comprising:
a parameter component configured to determine the set of sensor parameters by extracting estimated values with an estimated process variation parameter determined from the capacitance values and the first pressure.

* * * * *